UNITED STATES PATENT OFFICE.

PAUL VOLKMANN, OF ELBERFELD, GERMANY, ASSIGNOR TO THE FARBEN-FABRIKEN, VORMALS FR. BAYER & CO., OF SAME PLACE.

PROCESS OF MAKING PIPERAZIN.

SPECIFICATION forming part of Letters Patent No. 482,108, dated September 6, 1892.

Application filed June 11, 1892. Serial No. 436,393. (Specimens.)

*To all whom it may concern:*

Be it known that I, PAUL VOLKMANN, doctor of philosophy and chemist, a subject of the Emperor of Germany, residing at Elberfeld, Prussia, Germany, (assignor to the FARBENFABRIKEN, VORMALS FR. BAYER & CO., of Elberfeld,) have invented a new and useful Improvement in the Manufacture of Piperazin, of which the following is a clear and exact description.

My invention relates to a new process of making piperazin by heating with sulphurous acid (sulphur dioxide) or alkaline bisulphites the dinitroso compounds of diphenylpiperazin, ditolylpiperazin, dixylylpiperazin, and dinaphthylpiperazin of the general formula:

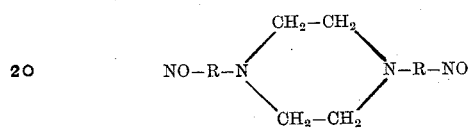

or sulpho-acids or other substitution products thereof.

In carrying out my process practically I proceed as follows: Ten kilos of dinitrosodiphenylpiperazin are introduced into forty-three kilos of a forty-per-cent. solution in water of sodium bisulphite and the mixture is heated to the boiling-point. An energetic reaction which corresponds with the following equation

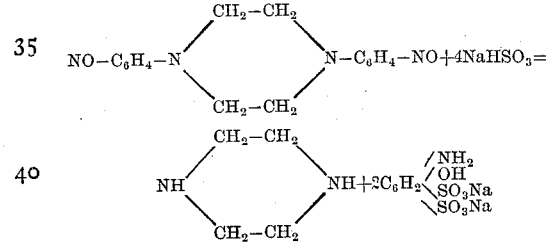

takes place without further heating and the dinitroso compound employed dissolves, the liquid assuming a yellowish color. After adding seventy kilos of concentrated muriatic acid the resulting liquid is heated to the boiling-point. On cooling sodium chloride and a part of the acid sodium salt of amidophenoldisulpho acid formed in the above reaction separate, while the other part of the said sodium salt and the piperazin hydrochlorate remain dissolved. The solution obtained by filtration is rendered alkaline with caustic soda and the piperazin is distilled by means of steam. After neutralizing with hydrochoric acid the distillate is evaporated and the piperazin hydrochlorate is thus obtained in a perfectly pure state.

In order to produce the piperazin itself, the muriatic salt is distilled, together with alkalies, in the known manner and the free base obtained by distilling shows all the properties of the pure piperazin described by Ladenburg.

The process is carried out in an analogous manner, starting from the dinitroso derivatives of ditolylpiperazin, dixylylpiperazin, dinaphthylpiperazin, or the sulpho-acids or other substitution products thereof.

The conversion of dinitrosodiphenylpiperazin into piperazin itself may also be effected in the following manner: Ten kilos of dinitrosodiphenylpiperazin are mixed with about three hundred liters of water and sulphur dioxide is introduced into the mixture obtained. The temperature being raised spontaneously to about 30° centigrade, the dinitroso compound gradually dissolves. When the latter has totally dissolved, muriatic acid is added and the resulting acid liquid is evaporated until the volume is only about seventy-five liters. After cooling soda-lye is added and the piperazin is distilled over by means of steam. The purification of the piperazin so obtained is effected in the manner above described. The reaction generally takes place in such a manner that the said substituted piperazins are decomposed by the action of sulphur dioxide or alkaline bisulphites, piperazin and amidophenol sulpho-acids being formed.

In the employment of this new process the formation of piperazin proceeds with a great readiness and the yield of the said compound is very good.

Having thus described the nature of this invention and in what manner the same is to be carried out, I declare that what I claim as new, and desire to secure by Letters Patent, is—

The new process of producing piperazin, which consists in treating the dinitroso compounds of diphenylpiperazin, ditolylpiperazin, dixylylpiperazin, dinaphthylpiperazin, or the sulpho-acids or other substitution products thereof with sulphurous acid, sulphur dioxide, or alkaline bisulphites.

In testimony whereof I have signed my name in the presence of two subscribing witnesses.

PAUL VOLKMANN.

Witnesses:
RUDOLPH FRICKE,
WM. ESSENWEIN.